UNITED STATES PATENT OFFICE.

HANS ARNOLD, OF CHARLOTTENBURG, GERMANY, ASSIGNOR TO THE FIRM OF DR. O. KNÖFLER & CO., OF PLOTZENSEE, NEAR BERLIN, GERMANY.

METHOD FOR MANUFACTURING UTENSILS AND THE LIKE FROM THE OXIDS OF THE RARE EARTHS, THORIUM OXID, ZIRCONIUM OXID, AND THE LIKE.

1,121,890.  Specification of Letters Patent.   Patented Dec. 22, 1914.

No Drawing. Original application filed December 20, 1913, Serial No. 808,013. Divided and this application filed May 12, 1914. Serial No. 838,031.

*To all whom it may concern:*

Be it known that I, HANS ARNOLD, a subject of the German Emperor, residing at Charlottenburg, near Berlin, Empire of Germany, have invented certain new and useful Improvements in Methods for Manufacturing Utensils and the like from the Oxids of the Rare Earths, Thorium Oxid, Zirconium Oxid, and the like, of which the following is a specification.

The object of the present invention is to make utensils or implements from thorium oxid, zirconium oxid or the oxids of the rare earths which have a considerably higher fusing point than china-clay mixture, quartz, aluminium oxid and similar substances for ceramic purposes.

In an application filed on December 20, 1913 (Ser. No. 808013) of which the present application has been branched off a method is described for manufacturing refractory utensils from the oxids of the rare earths, thorium oxid, zirconium oxid or mixtures of the oxids by subjecting them to pressure in a mold without the addition of any cementing media except water. That pressing operation is connected with certain drawbacks. On the one side it is comparatively expensive, and on the other side, the vessels or other articles so manufactured are rather heavy, whereas vessels, etc., of as low weight as possible are required. Trials have, therefore, been made to produce vessels consisting of pure oxids by casting them in the manner well known in the ceramic industry. These trials have proved successful; articles of the kind in question and of very great strength may, indeed, be produced also by casting, provided, that prior to this operation the mass has been rendered appropriately dense by the application of a strong pressure. The method is carried out in this way that the oxid or mixture of oxids is subjected to a high pressure for a pretty long time by which the mass which is at first very voluminous gradually becomes dense, the air in the pores being driven out by the high pressure. Preferably that high pressure is produced by mechanical means such as a hydraulic pressure exerted on a piston or in a similar manner. After withdrawing the pressure, the mass thus treated is turned into a comparatively thin paste by means of water, alcohol or the like and this mass is then poured into the molds shaping it to vessels, crucibles, implements, utensils, and so on, the articles so manufactured being then burned. The molded articles do not get cracks or fissures during the drying or during the burning and the final products are distinguished not only by their resistance to sintering and fusion but also by their great strength and density; they may be dropped upon a hard floor without breaking. In a variety of cases it is desirable to have vessels which not only resist the high temperatures mentioned but are, moreover, impervious to fluxes and gases. Such crucibles are required for instance for reducing and melting metals, viz: for keeping off, on one side, oxidizing gases, and on the other side, for keeping off carbonaceous gases which might render the metal impure by the formation of carbid or render it useless in another way, as would occur, for instance, with platinum.

Concerning the glazing of the vessels, it is obvious, that the fusing temperature of the glaze must be lower than that of the material of the vessel. It is known that small quantities of impurities lower the fusing point of the oxids considerably; in view of this, the glazing mass may receive an addition or additions of substances, such as titanium dioxid, aluminium oxid, silicic acid, and the like, in a definite quantity, or impure zirconium oxid may be employed from the beginning. By varying these additions and their quantities, mixtures with rising fusing points, corresponding to Seger's fusing cones, may be produced, and the glaze may be so chosen that its fusing point lies a few hundred degrees over the highest temperature which the vessel or crucible will be exposed to in actual use. The mixture selected is turned into a thick paste by means of alcohol and the implements or utensils are coated with this paste. The coated article is then carefully dried and after this preliminarily burned at a temperature of about 800° C., whereby the coating or glaze receives the necessary strength. Then the temperature is raised until the glaze is in melting condition. According as acid or alkaline fluxes are employed in the preparation of the glaze, the utensils or implements may be used also for rendering soluble ores of very different kinds by acid or basic substances. The articles coated with such glazes are, even in the highest temperatures, non-conductors or very bad conductors of electricity. This is of very great practical importance. The highest temperatures beyond 2000° C. can be produced solely by electric heating. Generally, a crucible of carbon inserted into the secondary circuit of a transformer is used. If impure oxids be employed as material for the formation of the crucible, this latter would become a conductor on being heated, the current would pass through the metal to be melted, the sectional area would become larger, the resistance less and the temperature would become lower. But owing to the present invention, in general and the glazes in question in particular, it is possible to render the crucible impervious without allowing it to become an electric conductor. Experiments have proved that it is possible to work for several hours running at temperatures over 3000° C., a result, that has generally been considered impossible up to the present. The possibility of manufacturing vessels and other utensils that may be regarded as practically perfectly refractory opens up new ways for carrying out many operations on a large scale, which could not hitherto be carried through.

Having now described my invention what I desire to secure by a patent of the United States is:

1. A method of manufacturing refractory utensils from the oxids of the rare earths, thorium oxid and zirconium oxid, consisting in subjecting the oxids to a high pressure, and after withdrawing the pressure, turning the thus prepared substance or substances into an appropriate paste by means of a suitable fluid, casting the mass into molds, and burning the thus shaped utensils, substantially and for the purpose as described.

2. The method of manufacturing refractory utensils from the oxids of the rare earths, thorium oxid and zirconium oxid, consisting in subjecting the mixture of the oxids to a high pressure, and after withdrawing the pressure, turning the thus prepared substance or substances into an appropriate paste by means of a suitable fluid, casting the mass into molds, and burning the thus shaped utensils, substantially and for the purpose as described.

3. The method of manufacturing refractory utensils from the oxids of the rare earths, thorium oxid and zirconium oxid, consisting in subjecting the oxids to a high pressure, and after withdrawing the pressure, turning the thus prepared substance or substances into an appropriate paste by means of a suitable fluid, casting the mass into molds, coating the thus shaped articles with a glaze composed of thorium oxid, zirconium oxid, and an additional oxid, the quantity of said additional oxid being made dependent upon the fusing point of the article to be produced, and burning the thus shaped and glazed utensils, substantially and for the purpose as described.

4. The method of manufacturing refractory utensils from the oxids of the rare earths, thorium oxid and zirconium oxid, consisting in subjecting the mixture of the oxids to a high pressure, and after withdrawing the pressure, turning the thus prepared substance or sustances into an appropriate paste by means of a suitable fluid, casting the mass into molds, coating the thus shaped articles with a glaze composed of thorium oxid, zirconium oxid, and an additional oxid, the quantity of said additional oxid being made dependent upon the fusing point of the article to be produced, and burning the thus shaped and glazed utensils, substantially and for the purpose as described.

In testimony whereof I affix my signature in presence of two witnesses.

HANS ARNOLD.

Witnesses:
 HENRY HASPER,
 WOLDEMAR HAUPT.